United States Patent
Takai et al.

(10) Patent No.: US 6,826,765 B2
(45) Date of Patent: Nov. 30, 2004

(54) DISK PLAYER

(75) Inventors: Kazuki Takai, Tokyo (JP); Akira Takahashi, Nagoya (JP); Yoshikazu Omura, Nagoya (JP)

(73) Assignee: Clarion Co., Ltd., Tokyo (JP)

( * ) Notice: Subject to any disclaimer, the term of this patent is extended or adjusted under 35 U.S.C. 154(b) by 94 days.

(21) Appl. No.: 10/381,688

(22) PCT Filed: Sep. 26, 2001

(86) PCT No.: PCT/JP01/08333

§ 371 (c)(1),
(2), (4) Date: Mar. 25, 2003

(87) PCT Pub. No.: WO02/27719

PCT Pub. Date: Apr. 4, 2002

(65) Prior Publication Data

US 2004/0022160 A1 Feb. 5, 2004

(30) Foreign Application Priority Data

Sep. 26, 2000 (JP) .......................................... 2000-293018
Mar. 13, 2001 (JP) .......................................... 2001-070686

(51) Int. Cl.$^7$ .................................................. G11B 33/02
(52) U.S. Cl. ....................................... 720/619; 369/77.11
(58) Field of Search ........................... 720/619, 600, 720/623; 369/77.21, 77.11, 75.21, 75.11, 178, 77.1, 77.2, 75.1, 75.2; 360/99.06

(56) References Cited

U.S. PATENT DOCUMENTS 4,625,304 A * 11/1986 Kanamaru et al. ......... 369/75.2
4,979,160 A * 12/1990 Araki ......................... 369/75.2
6,147,948 A * 11/2000 Tanaka et al. .............. 369/77.1
6,760,282 B2 * 7/2004 Adachi et al. ............ 369/30.81
2004/0022160 A1 * 2/2004 Takai et al. ................. 369/77.1

FOREIGN PATENT DOCUMENTS

JP       2955116       7/1999
JP       11-144353    12/1999

* cited by examiner

Primary Examiner—Allen Cao
(74) Attorney, Agent, or Firm—Flynn, Thiel, Boutell & Tanis, P.C.

(57) ABSTRACT

A disk player compatible with two types of large and small diameter disks is provided. A startup arm 20 is transversely moved by a selection arm 50 turned by abutment of a side edge of a large diameter disk 14b. Then, the startup arm 20 turning together with a shift bar 17 moved to be pushed at the front edge of the disk 14b is longitudinally moved. A cam follower pin 25 is engagingly locked with a pocket 53c by a spring 24, and the startup arm 20 is constrained in cooperation with a swivel shaft 22, whereby the shift bar 17 is restricted, and the center of the large diameter disk is positioned. The small diameter disk 14a restricts the shift bar 17 by the startup arm 20 by which the cam follower pin 25 is engagingly locked with the pocket 43c by the spring 24 irrespective of the selection arm 50. The center of the small diameter disk is positioned at the same central position as that of the large diameter disk.

4 Claims, 7 Drawing Sheets

(a)  (b)

DISK PLAYER

TECHNICAL FIELD OF THE INVENTION

The present invention relates to a disk player for reproducing an optical disk signal including CD, LD, DVD, etc. More particularly, the present invention relates to a disk clamping mechanism automatically compatible to both of a large diameter disk of 12 cm in diameter and a small diameter disk of 8 cm in diameter.

BACKGROUND OF THE INVENTION

When one disk to be reproduced is manually inserted into an insert port, automatic operation is carried out from carrying the disk to a turntable to claming the disk. After the end of reproduction, in a disk player for ejecting the disk by automatic operation, a clamping mechanism must be positioned upwardly via a gap from a disk top face so as not to interfere with the disk face. In addition, the turntable must be positioned lower than the disk bottom face so that a central protrusion engaging with the disk does not inhibit invasion of the disk bottom face. Further, in order to interrupt external vibration, some gap must be ensured in the vertical direction of the disk face in consideration of the fact that an apparatus is placed in a floating state.

In addition, in order to make compatible with two types of disks of large and small diameters, it is necessary to provide a lock mechanism for identifying both of these disks from each other, and then, maintaining the environment set to be compatible with a respective one of the disks. This causes a mechanism to be more complicated and the number of parts to be increased because of the necessity of routine construction of an automated system using a plenty of peripheral instruments such as optical sensors, microswitches, or solenoids. In addition, a housing space and cost thereof are increased.

In Japanese Patent No. 2955116, there is disclosed a disk loading device compatible with two types of disks having large and small diameters. In this disclosure, a rack gear 4 and a side face of a shift plate 11 are vertically arranged on the faces of a CD 12 and a CD 13, and thus, the dimensions in this direction cannot be reduced any more. Further, a mechanism including a stopper arm 8, a lock arm 9, and a stopper arm spring 8a inhibits the dimensions in the thickness direction vertical to the faces of the CD 12 and the CD 13 and reduction in the number of parts.

However, for a disk player which is used for a car or which is incorporated in a computer and is functioned, a market always requires light weight, compact design, higher reliability due to a simplified structure, and a low price.

Therefore, it is an object of the present invention to provide a mechanism which is compatible with two types of disks having large and small diameters, which reduces the number of parts with its simplified construction to minimize the dimensions in the thickness direction, and which is reliably actuated to be applied to a disk player with its low cost.

DISCLOSURE OF THE INVENTION

In order to achieve the above described object, a disk player according to the present invention comprises: a carriage mechanism for basically feeding a selected one of the small diameter and large diameter disks to a turntable; and a clamping mechanism for compressing the disk to the turntable.

The disk player according to the present invention comprises: a selection arm which abuts against the disk and which can be turned according to its disk diameter; a shift bar which abuts against the disk and which can be moved in a disk feeding direction; a startup arm which is engaged with the shift bar and which turns the shift bar to be interlocked so as to be movable in the disk feeding direction; inscribed cam means in which the startup arm is coupled with a clamp arm of the clamp mechanism via a cam, thereby restricting turning, the cam means being capable of engagingly locking the startup arm at a different position depending on the scale of the diameter of the disk to be fed; first biasing means for biasing the shift bar in a direction opposite to the disk feeding direction; and second biasing means for biasing the startup arm, thereby holding the arm at a different engagingly locked position of the inscribed cam.

In the disk player according to the present invention, with the above described construction, the disk moving the shift bar to be pushed against the biasing force of the first biasing means turns the selection arm and controls the startup arm. Then, the shift bar is restricted by the startup arm held at any of the engagingly locked position of the inscribed cam, whereby the centers of the disks having their different diameters are positioned at the same position.

Here, the first biasing means and the second biasing means are constructed to provide one tensile coil sprint in a tensile manner between the startup arm and the clamp arm. In addition, in the startup arm, a swivel shaft is slidably guided to the clamp arm by a straight groove provided at a right angle relevant to the advancement direction of the disk. In addition, a cam follower pin erected at a position spaced from the swivel shaft of the startup arm introduces swiveling of the startup arm while a slide contact is maintained with either of first and second cam portions provided at the inscribed cam corresponding to a respective one of the large and small diameters of the disk to be fed by the biasing force of the tensile coil spring. This cam follower pin is constrained to either of a first pocket and a second pocket provided at terminals of the first and the second cams, whereby movement of the startup bar is inhibited in cooperation with the swivel shaft restricted by the straight groove.

The present invention is characterized in that movement from the first cam portion of the cam follower pin to a second cam portion is carried out in planar movement following a path defined by longitudinal movement of the shift bar moving in a disk feeding direction and transverse movement of the startup arm together with swinging movement of the selection arm in a cooperative manner, and these movements are not carried out by a specified guide groove which is mechanically formed.

BEST MODE FOR CARRYING OUT THE INVENTION

Figure 1:
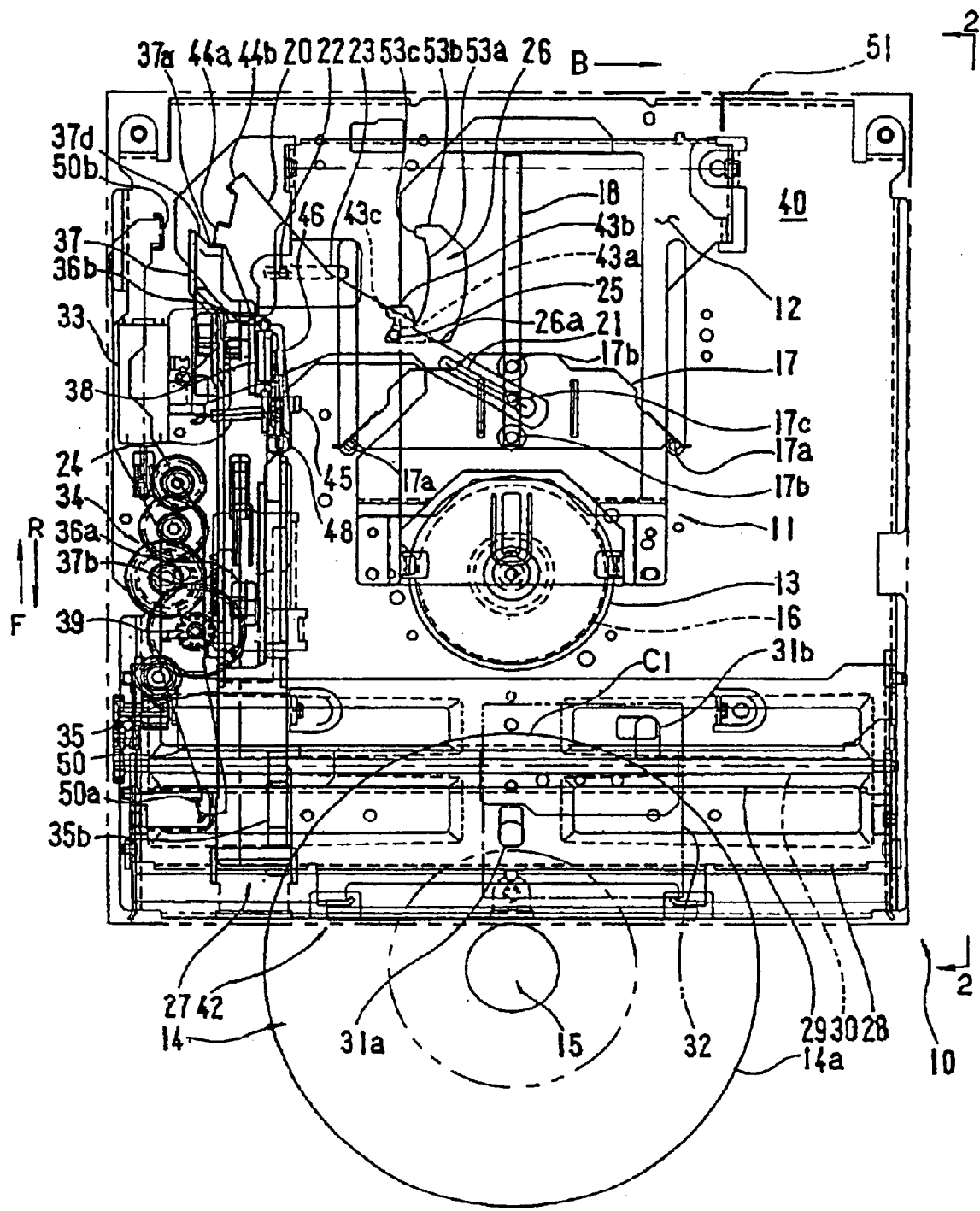
FIG. 1 is a schematic plan view showing a loading state of a small diameter disk in a disk player according to the present invention.
Figure 2:
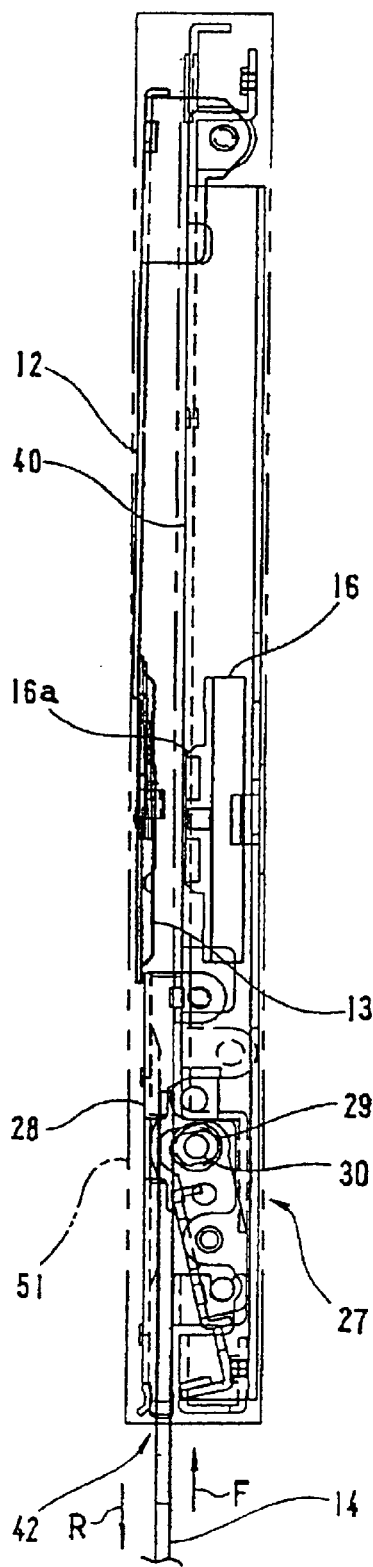
FIG. 2 is an enlarged side view taken along the line 2—2 of FIG. 1.
Figure 3:
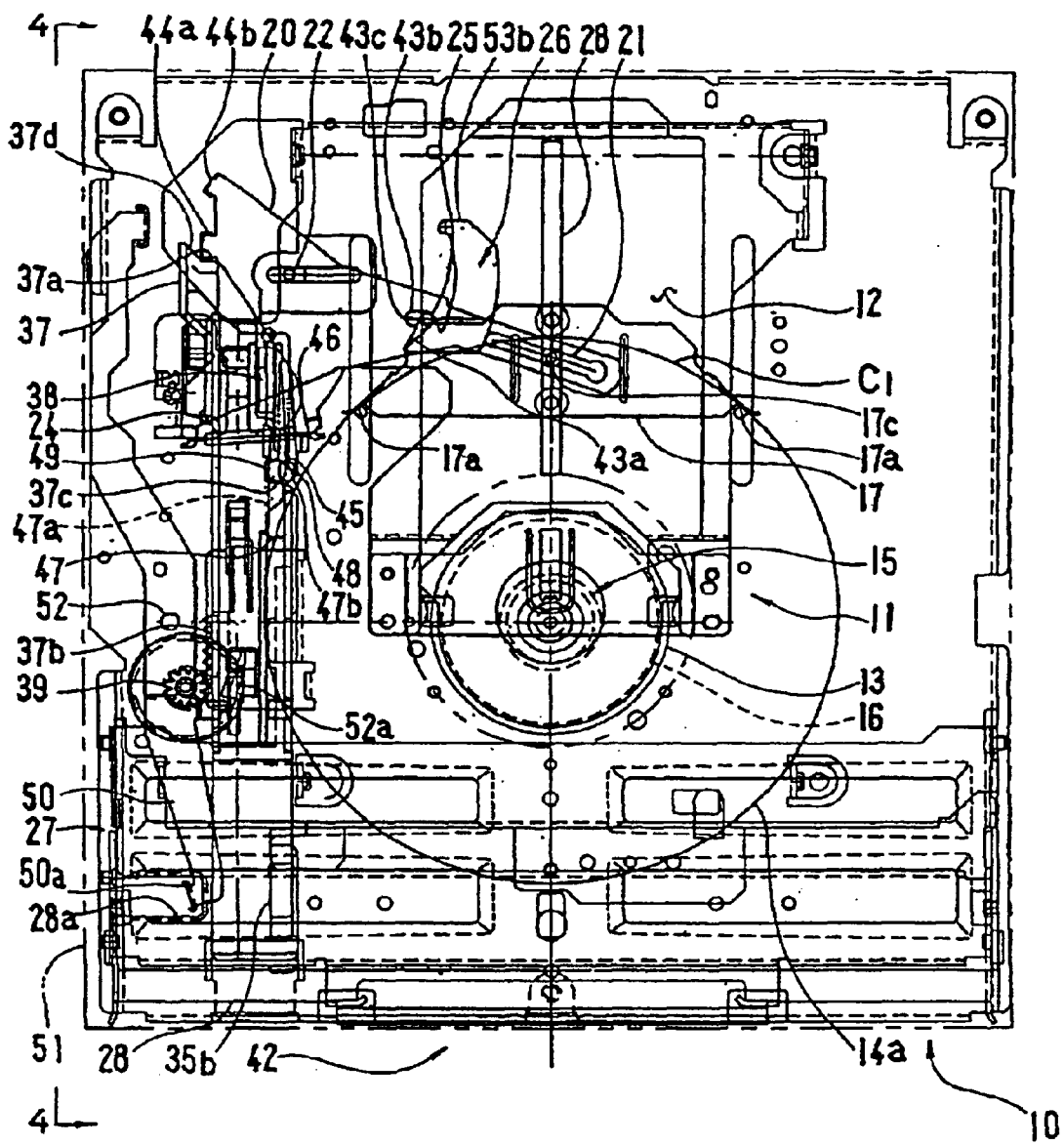
FIG. 3 is a schematic plan view showing a state in which a small diameter disk is set in the disk player according to the present invention.

Hereinafter, preferred embodiments of the present invention will be described with reference to the accompanying drawings showing one embodiment of a disk player according to the present invention. FIG. 1 is a plan view showing a schematic internal mechanism when a disk player 10 according to the present invention is set at a standby position (a home position), wherein a housing and a chassis are illustrated in a transparent manner in order to clearly show a hidden portion. FIG. 2 is an enlarged side view taken along the line 2—2 of FIG. 1. In the figure, a direction in which when the disk is moved to be inserted denotes a forward direction (F direction), and movement in the opposite direction denotes a retracting direction (R direction). Reference numeral 11 denotes a clamping mechanism, wherein a center portion 15 of disks 14a, 14b (generally indicated by reference numeral 14) is aligned with the center of a turntable at a free end of the clamp arm 12 by the clamping action caused by a rotatably supported clamp ring 13. At a shift bar 17 moved to be pushed by the disks 14a, 14b, an erected piece 17a engaged with outer periphery edges C1, C2 of the disks 14a, 14b is formed to be folded at a right angle at both of the left and right ends. The shift bar 17 guides a long groove 18 punched at the clamp arm 12, can slide in the vertical direction in the figure (in the movement direction of the disk 14), is embedded in the shift bar 17, and guided forwardly or backwardly by two guide pins 17b fitted with the long groove 18 to be moved in parallel.

Further, a connection pin 17c is erected at the center of two guide pins 17b embedded in the shift bar 17, and slidably engaged into the long hole 21 punched at the tip end of a startup arm 20. A swivel shaft 22 embedded in the startup arm 20 guides a straight groove 23 punched on the clamp arm 12, and is slidably supported in the transverse direction in the figure (a direction vertical to the movement direction of the disk 14). The startup arm 20 can be turned around the swivel shaft 22.

In addition, in the startup arm 20, as biasing means, a tensile coil spring 24 is provided in a tensile manner between the startup arm and the clamp arm 12. This spring is biased around the swivel shaft 22 in the clockwise direction in the figure. Further, at the startup arm 20, a cam follower pin 25 is embedded at a position spaced from the swivel shaft 22. Then, this cam follower pin abuts against a straight portion 26a formed in parallel to the straight groove 23 at the internal wall front edge of an inscribed cam 26 punched at the clamp arm 12; supports the biasing force of the tensile coil spring 24; and inhibits free turning movement of the startup arm 20.

A top face guide plate 28 (refer to FIG. 2) of the carriage mechanism 27 brings the top face of the disk 14 into slide contact with the bottom face, and guides it in parallel to the face of the turntable 16. A roller 29 is provided at the bottom face of the top face guide plate 28, and a rotary shaft 30 is transversely provided relevant to the top face guide plate 28. The disk 14 is configured so as to be pinched in cooperation with the bottom face of the opposite top face guide face 28.

In addition, on the top face of the top face guide plate 28, there is provided a printed circuit board 32 including photo sensors 31a, 31b for sensing insertion and ejection of the disk 14 and for identifying whether the diameter of the disk is large or small in size. When the sensor senses insertion of the disk 14, a drive motor 33 is started up to interlock a gear train 34 coupled with the rotary shaft 30 of the roller 29. Then, the roller 29 is rotated in a direction in which the disk 14 is fed to the turntable 16 (in the direction indicated by the arrow F).

Figure 7:
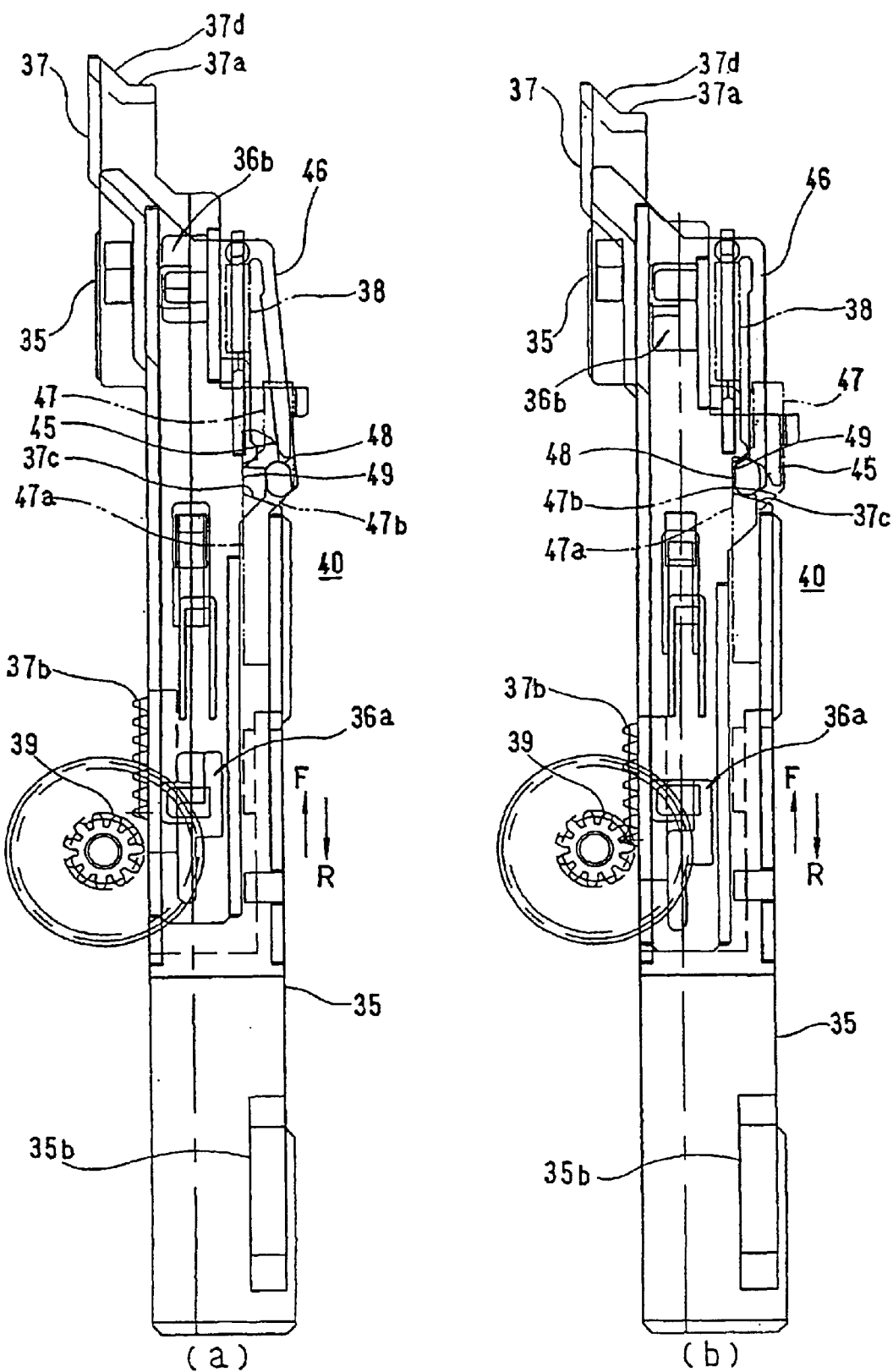
FIG. 7 is an enlarged schematic plan view illustrating a relationship between a slide rack and a slide plate in the disk player according to the present invention, wherein (a) shows a state in which relative movement is possible, and (b) shows a state in which integrated movement is made.

A slide rack 37 guided to the engagement portions 36a, 36b provided at the slide plate 35 shown in detail in FIG. 7, the slide rack being coupled with the slide plate 35 so that relative sliding is possible, is biased in a direction spaced from a drive pinion 39 by a tensile coil spring 38 provided in a tensile manner between the rack and the slide plate 35. The slide plate 35 is supported so as to be slid in the forward or the backward direction (in the direction indicated by the arrow F-R) parallel to the movement direction of the disk along the bottom face of the drive board 40. The movement in the transverse and the vertical direction (in a direction vertical to paper face) is restricted. As illustrated, the gear face of the slide rack 37 is made vertical to the disk face, whereby only the plate thickness of the slide rack 37 is included in dimensions in the vertical direction. Thus, a housing 51 can be thinly constructed.

Either of the first link portion 44a and the second link portion 44b provided at the end of the startup arm 20 is opposed to an end 37a at the rear of the slide rack 37. Either of the first link portion 44a and the second link portion 44b is abutted against the end 37a of the slide rack 37 by swiveling operation of the startup arm 20. Then, the slide rack 37 is relatively moved in the frontal side (in the direction indicated by the arrow R) on the slide plate 35, and the tooth portion 37b is moved to be pushed against a position geared with the drive pinion 39.

As shown in FIG. 7(a), on the slide plate 35, a cam follower 48 punched at the tip end of a laterally extended plate sprint 46 abuts against a bent site 47b of a crank shaped cam groove 47 (indicated by double dotted chain line) punched on a drive board 40, and movement is inhibited. Thus, the slide rack 37 moved to be pushed by either of the first link portion 44a or the second link portion 44b relatively moves to the slide plate 35 against the biasing force while extending the tensile coil spring 38 provided in a tensile manner between the rack and the slide plate 35.

As shown in FIG. 7(b), the slide rack 37 compresses the cam follower 48 to be engaged into a recess 49 of the slide plate 35 by an action piece 45 while the tooth portion 37b is made proximal to the drive pinion 39. At the same time, the slide rack releases inhibition of the bent site 47b, and causes the bent site to be advanced into an inductive groove 47a of a crank shaped cam groove 47. While the slide rack 37 is driven by being geared with the drive pinion 39, the cam follower 48 holds engagement with the recess 49 by constraining of the inductive groove 47a. In this manner, in the slide rack 37, a fixedly provided stopper 37c is engagingly locked with the cam follower 48. While the tensile coil spring 38 is held in an extended state, a relative position to the slide plate 35 is fixed, and integrated movement is made.

Figure 4:
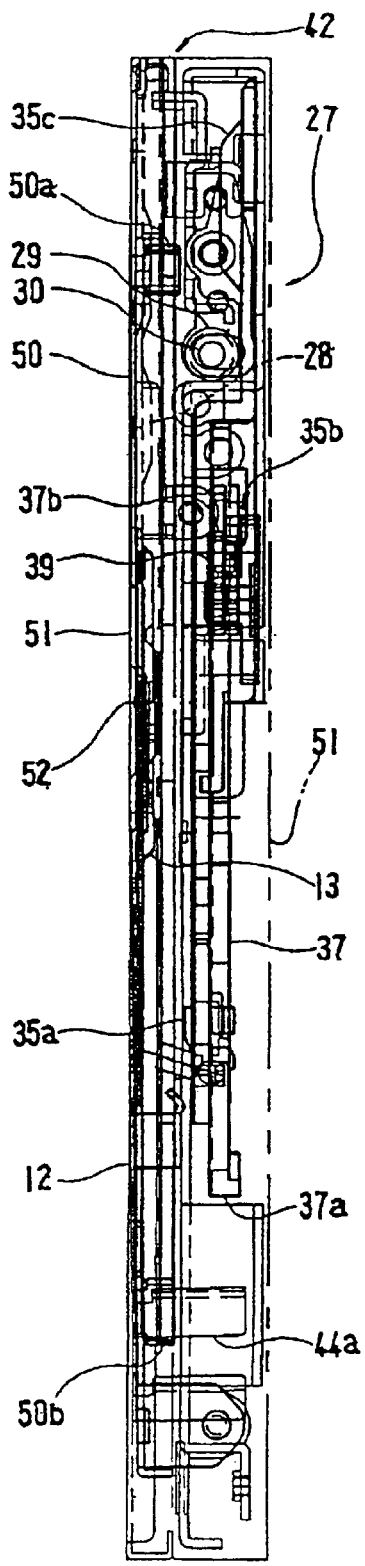
FIG. 4 is an enlarged side view taken along the line 4—4 of FIG. 4.

When the drive pinion 39 is inverted, the tooth portion 37b of the slide rack 37 synchronizes with a position at which gearing with the drive pinion 39 is released. Then, the cam follower 48 reaches a bent site 47b of the crank shaped cam groove 47, and constraint is released. Here, the stopper 37c of the slide rack 37 pushes out the cam follower 48 from the recess 49 in cooperation with the plate spring 46, and releases an engagingly locked state. The slide rack 37 is forcibly moved in the upward direction in the figure (in the direction indicated by the arrow F) by the constraint force of the tensile coil spring 38. This slide rack returns to an initial state completely spaced from the drive pinion 39. A cam follower (not shown) engaged with a respective one of a plurality of cams 35a, 35b, 35c (refer to FIG. 4) formed on the slide plate 35 is interlocked with another by reciprocating action of the slide plate 35. Then, movements of the clamp mechanism 11, the turntable 16 and the top face guide plate 28, and the roller 29 lying in a linkage relationship with this top face guide plate are controlled.

Reference numeral 50 (refer to FIG. 1, FIG. 3, FIG. 5, and FIG. 6) denotes a selection arm, wherein its substantial center of the length is turnably supported around a swivel shaft 52 embedded in a housing 51 for housing a board 40, and is biased by a tensile coil spring 52a provided in a tensile manner between the arm and the housing 51 in the counterclockwise direction in the figure. A first end 50a formed by bending one end of the selection arm 50 penetrates a notch 28a provided at the top face guide plate 28, and extends at the bottom face side of the top face guide plate 28. This first end engages with only an outer periphery edge C2 of a large diameter disk 14b to be inserted, and does not interfere with an outer periphery edge C1 of a small diameter disk 14a. In addition, the another second end 50b is arranged at a position opposed to the first linkage portion 44a of the startup arm 20.

Now, an operation of the disk player 10 according to the present invention will be described here with reference to FIG. 1 to FIG. 4. When a small diameter disk (8 cm) 14a is inserted through an insert port 42 of the disk player which is in a standby state shown in FIG. 1 and FIG. 2, the insertion is sensed by a disk detection photo sensor 31a. Then, the drive motor 33 is started up, and the roller 29 starts rotation. The small diameter disk 14a abuts against the outer periphery face of the roller 29 at its bottom face, and is subjected to the driving force caused by frictional transmission. Then, the disk is horizontally guided while it comes into slide contact with the bottom face of the top face guide plate 28. Further, the disk is fed in parallel to the table face towards the turntable 16.

In the small diameter disk 14a fed by the roller 29, when the outer periphery front edge C1 abuts against an erected piece 17a folded at both ends of the shift bar 17, the shift bar 17 is moved to be pushed in the upward direction in the figure (in the direction indicated by the arrow F) along the long groove 18 by the drive force transmitted from the roller 29. By this operation, the connection pin 17c erected at the shift bar 17 and engaged into the long hole 21 of the startup arm 20 turns the startup arm 20 around the swivel shaft 22 while sliding in abutment against the internal wall of the long hole 21. A cam follower pin 25 embedded in the startup arm 20 moves along a first cam portion 43a of an inscribed cam 26 while it is subjected to the biasing force of the tensile coil spring 24.

The startup arm 20 in which the cam follower pin 25 reaches the first engagement position 43b, and turning movement is inhibited, restricts the shift bar 17, and inhibits movement of the small diameter disk 14a. At this position, the biasing force of the tensile coil spring 24 locks the cam follower pin 25 at the retracted position of a pocket 43c, determines the position of the shift bar 17, and positions the small diameter disk 14a. By chucking operation of the clamp mechanism 11, the small diameter disk 14a subjected to the centering adjustment action caused by the conical face of a tapered boss face 16a at the center of the turntable 16 moves to the aligned position, whereby the outer periphery edge C1 of the small diameter disk 14a is spaced from the erected piece 17a. The small diameter disk 14a is released from its abutment state in the foregoing pushing and the moving operation, and stable rotation can be obtained.

At the first link portion 44a abutted against the slide rack rear end 37a by turning of the startup arm 20, the slide rack 37 is moved to be pushed against the biasing force of the tensile coil spring 38 up to the position at which the tooth portion 37b is geared with the drive pinion 39. Then, the relative position of the slide rack 37 is moved to the slide plate 35 braked by abutment of the cam follower 48 against the bent site 47b at the inlet of the inductive groove 47a of the crank shaped cam groove 47. In the slide rack 37, the action piece 45 engages the cam follower 48 into the recess 49 at a position at which driving by the drive pinion 39 is started, and integrates the slide plate 35. Then, the slide rack moves in the frontal side (in the direction indicated by the arrow R) while constraining the cam follower 48 along the inductive groove 47a.

The cam 35a provided at the slide plate 35 is functioned by sliding operation of the slide plate 35. By chucking operation of the clamp mechanism 11, the small diameter disk 14a is aligned by being compressed on a tapered face of a boss formed at the outer periphery protruded at the center of the turntable 16. The shift bar 17 is constrained at the first engagingly locked position 43b, and thus, the outer periphery edge C1 of the small diameter disk 14a whose center is retracted to the aligned position by the chucking operation is spaced from the erected piece 17a of the shift bar 17 which has been moved to be pushed so far.

Further, by sliding operation of the slide plate 35, the carriage mechanism 27 ensures a gap between the roller 29 having come into contact with the slide plate for the purpose of driving and the bottom face of the small diameter disk 14a. At the same time, the carriage mechanism ensures a gap between the bottom face of the top face guide plate 28 having undergone slide guiding and the top face of the small diameter disk 14a, and forms a reproduction state. As a result, the small diameter disk 14a can rotate freely without being subjected to interference with an external peripheral member. The photo sensor 31a is positioned outside of the small diameter disk 14a, and the photo sensor 31b is positioned inside of the small diameter disk 14a. Thus, it is possible to check whether the diameter of the disk to be reproduced is large or small in size by a sense signal generated by both of these sensors. The slide plate 35 actuates a limit switch (not shown) at a maximum stroke position, and stops rotation of the drive pinion 39.

Now, an operation for ejecting the small diameter disk 14a whose reproduction has terminated will be described here. At the end of reproduction, the drive pinion 39 is inverted by switching operation of an electric circuit (not shown), and the slide rack 37 is moved in the upward direction in the figure (in the direction indicated by the arrow F). Cams 35a, 35b, and 35c provided at the slide plate 35 move in the opposite direction together with the slide rack 37. Thus, the small diameter disk 14a is pinched between the top face guide plate 28 abutting against both of the top and the bottom faces and the roller 29. On the other hand, the clamp mechanism 11 opens upwardly, and releases chucking of the small diameter disk 14a. The turntable 16 is retracted from the bottom face of the small diameter disk 14a to the spaced position, and is set at an initial standby state. At this time, the roller 29 of the carriage mechanism 27 is inverted, and thus, the small diameter disk 14 is ejected from the insert port 42.

By movement in the upward direction in the figure (in the direction indicated by the arrow F) of the slide rack 37, a tapered portion 37d at the rear end of the slide rack comes into contact with the first link portion 44a of the startup arm 20. Further, when the slide rack 37 moves in the upward direction in the figure (in the direction indicated by the arrow F), the startup arm 20 is moved to be pushed in the central direction (in the direction indicated by the arrow B in the figure) by slanting action of the tapered portion 37d. The cam follower pin 25 which constrains the startup arm 20 at the first engagingly locked position 43b is pushed out from the pocket 43c. Then, the startup arm 20 is turned in the clockwise direction by the biasing force of the tensile coil spring 24 provided in a tensile manner between the startup arm and the clamp arm 12, and returns to its initial standby state.

At this time, the tooth portion 37b is set at a position at which gearing with the drive pinion 39 is released. As described above, the stopper 37c of the slide rack pushes out the cam follower 48 from the recess 49, and releases the engagingly locked state. Then, the integration between the slide plate 35 and the slide rack 37 is eliminated, and by the biasing force action of the tensile coil spring 38 held at the stopper 37c, the slide rack 37 returns to its initial position at which the tooth portion 37b is spaced from the drive pinion 39, and enters its standby state. The completion of ejecting the small diameter disk 14a can be checked by the photo sensor 31b.

Now, an operation when the large diameter disk (12 cm) 14b is applied to the disk player 10 according to the present invention will be described here with reference to FIG. 5. When the large diameter disk 14b is inserted through the disk insert port 42 of the disk player 10 which is in a standby state shown in FIG. 1 and FIG. 2, the insertion is sensed by the disk detection photo sensor 31a. Then, the drive motor 33 is started up, and the roller 29 starts rotation.

Figure 5:
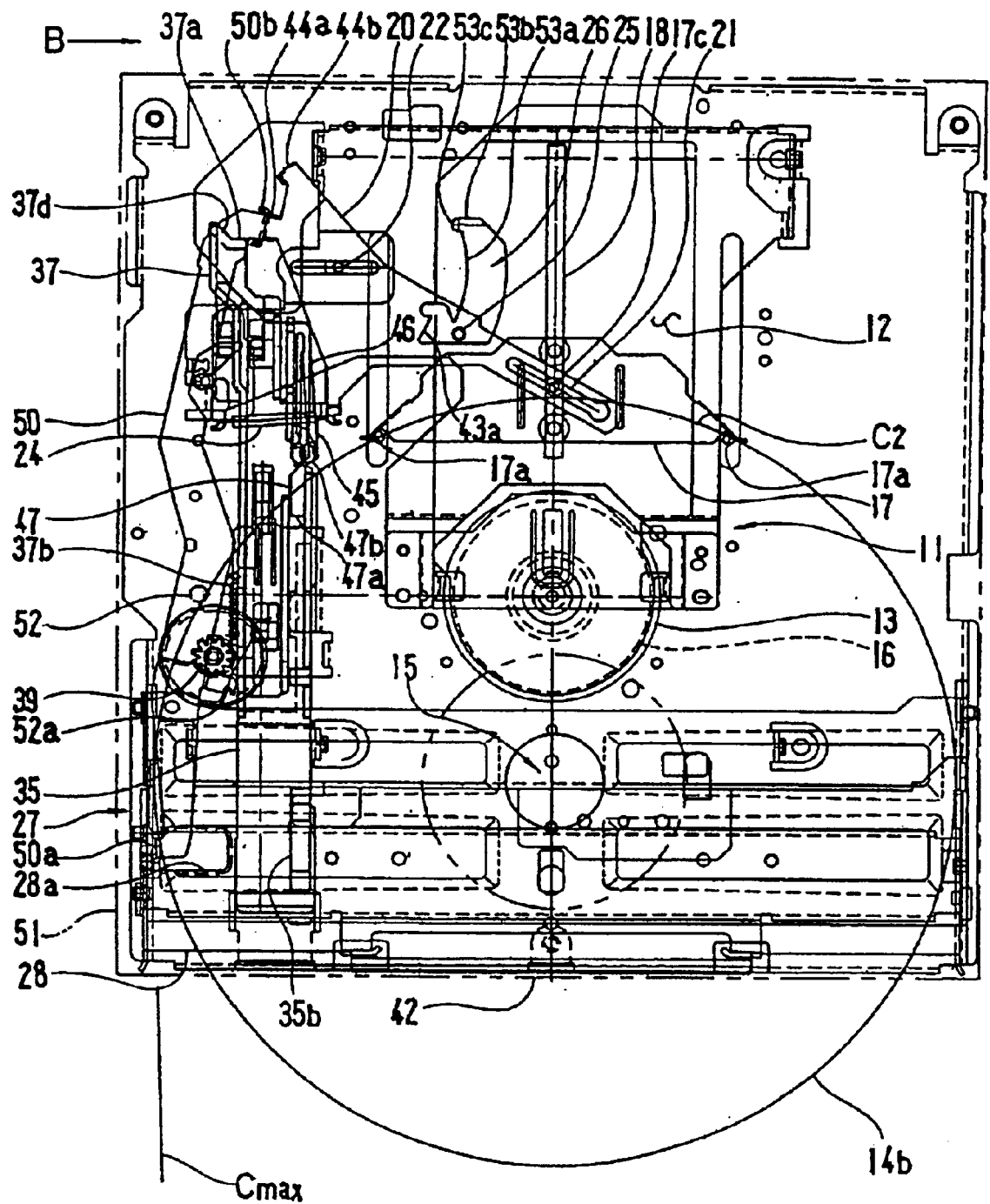
FIG. 5 is a schematic plan view showing a loading state of a large diameter disk in the disk player according to the present invention.
Figure 6:
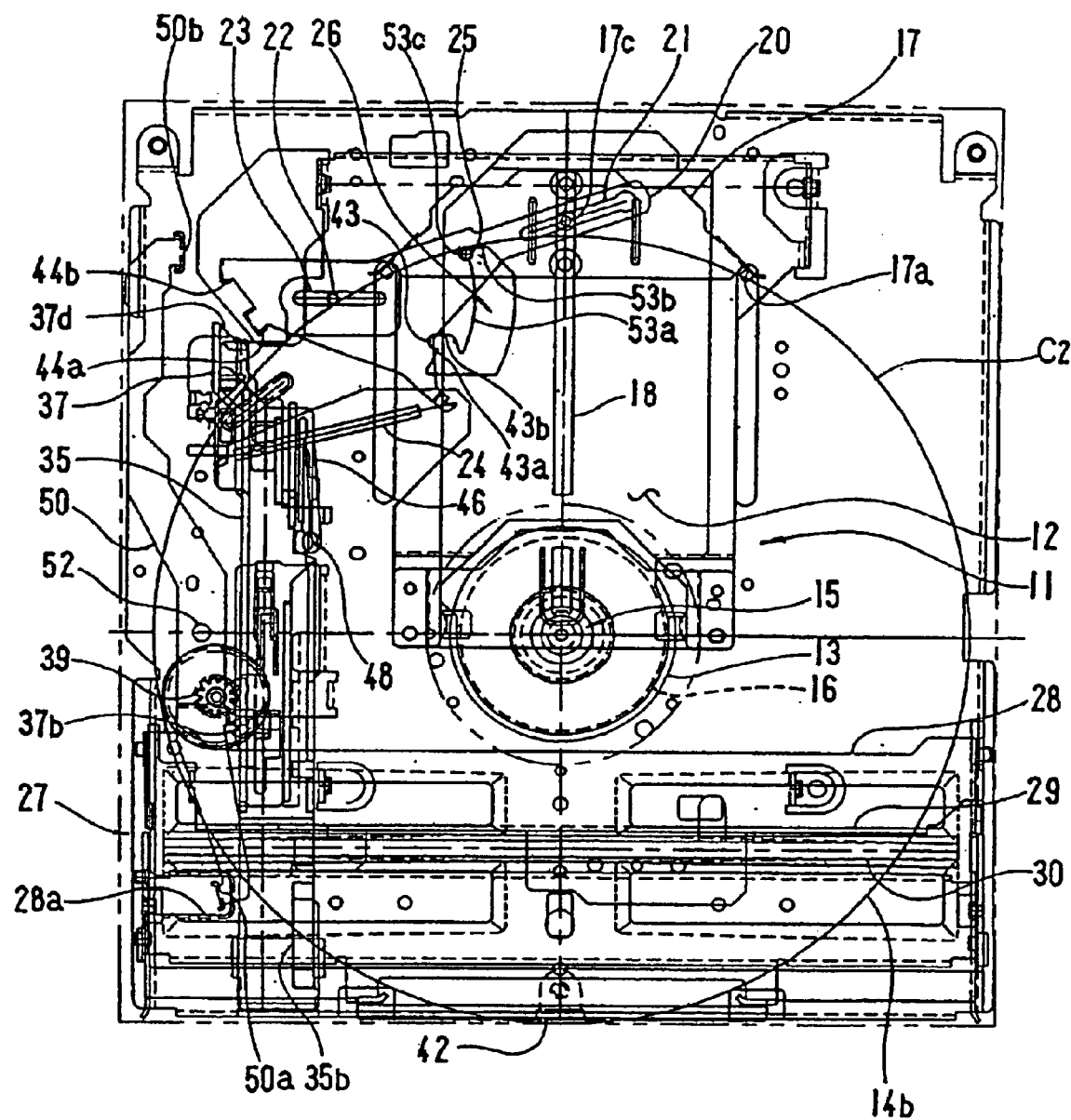
FIG. 6 is a schematic plan view showing a state in which a large diameter disk is set in the disk player according to the present invention.

As shown in FIG. 5, the outer periphery edge C2 of the inserted large diameter disk 14b abuts against a first end 50a of a selection arm 50. The selection arm 50 swings in accordance with the large diameter disk 14b fed by the roller 29. This selection arm turns in the clockwise direction in the figure around a swivel shaft 52 against the biasing force of a tensile coil spring 52a. By this operation, a second end 50b of the selection arm 50 abuts against the first link portion 44a of the startup arm 20, and moves the startup arm 20 to be pushed in the right direction in the figure (in the direction indicated by the arrow B).

While the startup arm 20 moves in parallel in the right direction in the figure along the straight groove 23 restricting the swivel shaft 22 and the cam follower pin 25 and the frontal edge straight portion 26a of the inscribed cam 26, the cam follower pin 25 is moved from a region of the first cam portion 43a to a region of a second cam portion 53a by movement of the shift bar 17 moved to be pushed by the outer periphery edge C2 of the large diameter disk 14b. The first end 50a is maximally displaced toward the outside at a slide top Cmax with the outer periphery edge C2 corresponding to a diameter portion orthogonal to a direction in which the large diameter disk 14b advances. Then, this first end turns in a direction in which the first end returns to its initial position. A guide groove for moving the cam follower pin 25 from the inscribed cam front edge 26 to the second cam portion 53a is not particularly provided. The cam follower pin 25, however, moves in a free planar motion a path in a chamber defined by longitudinal movement of the shift bar 17 and transverse movement of the startup arm 20 together with swinging movement of the selection arm 50 in a cooperative manner. Ejecting operation of the large diameter disk 14b in this mechanism is carried out in accordance with the completely reversed order. However, the disk can return to its initial standby position without any resistance.

In this operation, the second end 50b of the selection arm turns in a direction spaced from the first link portion 44a of the startup arm 20. The cam follower pin 25 abuts against the second cam portion 53a by being subjected to the biasing force of the tensile coil spring 24 provided in a tensile manner between the pin and the clamp arm 12. Then, the second link portion 44b of the startup arm 20 is opposed to the end 37a at the rear of the slide rack. In this duration, as is the case with the small diameter disk 14a, when the outer periphery edge C2 of the large diameter disk 14b abuts against the ejected piece 17a of the shift bar 17, the shift bar 17 is moved to pushed in the upward direction in the figure (in the direction indicated by the arrow F) along the long groove 18 by the drive force transmitted from the roller 29.

The startup arm 20 turns around the swivel shaft 22 together with the shift bar 17 moving in the upward direction in the figure (in the direction indicated by the arrow F). The cam follower pin 25 moves to the second engagingly locked position 53b along the second cam portion 53a while the pin is subjected to the biasing force of the tensile coil spring 24. When the cam follower pin 25 reaches the second engagingly locked position 53b, the cam follower pin 25 is retracted into the pocket 53c and is locked there by the biasing force of the tensile coil spring 24 acting on the startup arm 20 whose turning is inhibited. Therefore, in the shift bar 17 subjected to restriction of the startup arm 20, its position is determined, and movement of the large diameter disk 14b is inhibited. Then, the center of the large diameter disk 14b is positioned at the same position as that of the small diameter disk 14a.

By chucking operation of the clamp mechanism 11, the large diameter disk 14b subjected to action of a tapered boss face at the center of the turntable 16 is moved to its aligned position, whereby the outer periphery edge C2 of the large diameter disk 14b is spaced from the erected piece 17a, and is released from its abutment state in the foregoing pushing and moving operation. Thus, as is the case with the small diameter disk 14a, stable rotation can be obtained with no contact (refer to FIG. 6).

Unlike the case of the small diameter disk 14a, by turning movement of the startup arm 20, the second link portion 44b is abutted against the slide rack end 37a instead of the first link portion 44a. Then, the slide rack 37 is moved to be pushed against the biasing force of the tensile coil spring 38 up to the position at which the tooth portion 37b is geared with the drive pinion 39. Further, an operation for the cam follower 48 to move a relative position to the slide plate 35 braked in abutment against the bent site 47b of the cam groove is carried out in the completely same way as the case of the small diameter disk 14a.

Then, an action when the cam provided at the slide plate 35 is functioned relevant to the large diameter disk by the movement of the slide plate 35 is completely the same as the case of the small diameter disk 14a. An operation for ejecting the large diameter disk 14a is completely the same as the case of the small diameter disk 14a, and is carried out irrespective of the selection arm 50 functioned during insertion. Thus, a duplicate description is omitted here.

INDUSTRIAL APPLICABILITY

As is evident from the foregoing description, in a disk player according to the present invention, at first and second engagingly locked positions of the respective ends of first and second cams controlling swiveling of a startup arm relevant to large diameter and small diameter disks, a startup arm is constrained at a position determined at two points of a swivel shaft and a cam follower pin, and the position of a shift bar is restricted. Thus, the centers of the disks are aligned with each other at the same position, whereby reliable positioning can be ensured. In addition, the startup arm is restricted by an inscribed cam fixed at a relative position to a turntable. Thus, a mechanism is simplified without degrading operational reliability, and the number of parts is reduced. Thus, the disk player can be thinly constructed.

Further, in this manner, a vibration isolating member is externally provided for a car or for incorporation into a personal computer or the like even in a small space. Thus, the disk can be easily housed in a floating state. Accordingly, an operation for feeding disks having their different diameters can be carried out reliably with a mechanical construction without using an expensive member such as an optical sensor or a solenoid for detecting and setting the position. Thus, the manufacturing cost can be remarkably reduced.

What is claimed is:

1. A disk player including a carriage mechanism for basically feeding a selected one of the small diameter or large diameter disks to a turntable and a clamping mechanism for compressing the disk to the turntable, the disk player comprising:

a selection arm which abuts against the disk and configured to be turned according to its disk diameter;

a shift bar which abuts against the disk and configured to be moved in a disk feeding direction;

a startup arm which is engaged with the shift bar and which turns the shift bar to be interlocked so as to be movable in the disk feeding direction;

inscribed cam means in which the startup arm is coupled with a clamp arm of the clamp mechanism via a cam, thereby restricting turning, the cam means being capable of engagingly locking the startup arm at a different position depending on the scale of the diameter of the disk to be fed;

first biasing means for biasing the shift bar in a direction opposite to the disk feeding direction; and second biasing means for biasing the startup arm, thereby holding the arm at a different engagingly locked position of the inscribed cam, characterized in that the disk moving the shift bar to be pushed against a biasing force of the first biasing means turns the selection arm, thereby controlling the startup arm, and the shift bar is restricted by the startup arm held at either of the engagingly locked positions of the inscribed cam, thereby positioning the centers of disks having their different diameters at the same position.

2. A disk player as claimed in claim 1, wherein the first biasing means and the second biasing means are constructed by providing one tensile coil spring in a tensile manner between the startup arm and the clamp arm.

3. A disk player as claimed in claim 1, wherein, in the startup arm, a swivel shaft is slidably guided to the clamp arm in a straight groove provided at a right angle relevant to an advancement direction of the disk, and wherein a cam follower pin erected at a position spaced from a swivel shaft of the startup arm introduces swiveling of the startup arm while maintaining a slide contact with either of first and second cam portions provided at the inscribed cam corresponding to a respective one of the large and the small diameters of the disks to be fed by a biasing force of the tensile coil spring, the cam follower pin being constrained by either of a first pocket and a second pocket provided at terminals of the first and the second cams, whereby movement of the startup bar is inhibited in cooperation with the swivel shaft restricted in the straight groove.

4. A disk player as claimed in claim 3, characterized in that movement from the first cam portion of the cam follower pin to a second cam portion is carried out in planar movement following a path defined by longitudinal movement of the shift bar moving in a disk feeding direction and transverse movement of the startup arm together with swinging movement of the selection arm in a cooperative manner.

* * * * *